United States Patent
Boyt et al.

(10) Patent No.: US 9,637,917 B2
(45) Date of Patent: May 2, 2017

(54) DEVICES FOR FIXING ITEMS TO BUILDING STRUCTURES

(71) Applicant: Nicholson, Hertfordshire (GB)

(72) Inventors: Paul Boyt, Hertfordshire (GB); David Boyt, Hertfordshire (GB)

(73) Assignee: Nicholson STS LLP, Bassingbourn, Cambridgeshire (GB)

( * ) Notice: Subject to any disclaimer, the term of this patent is extended or adjusted under 35 U.S.C. 154(b) by 0 days.

(21) Appl. No.: 14/402,991

(22) PCT Filed: May 24, 2013

(86) PCT No.: PCT/GB2013/051369
§ 371 (c)(1),
(2) Date: Nov. 21, 2014

(87) PCT Pub. No.: WO2013/175226
PCT Pub. Date: Nov. 28, 2013

(65) Prior Publication Data
US 2015/0167296 A1    Jun. 18, 2015

(30) Foreign Application Priority Data

May 25, 2012 (GB) .................................. 1209197.1

(51) Int. Cl.
*E04F 19/00* (2006.01)
*E04B 7/18* (2006.01)
(Continued)

(52) U.S. Cl.
CPC ............... *E04B 7/18* (2013.01); *E04B 1/665* (2013.01); *E04D 5/14* (2013.01); *E04D 5/143* (2013.01);
(Continued)

(58) Field of Classification Search
CPC ........ F24J 2/5203; F24J 2/5245; F24J 2/5264; F24J 2/525; E04B 7/18; E04B 1/665;
(Continued)

(56) References Cited

U.S. PATENT DOCUMENTS 4,445,305 A * 5/1984 Orie, Sr. ...................... 52/309.9
4,741,132 A * 5/1988 Emblin ............................. 52/58
(Continued)

FOREIGN PATENT DOCUMENTS

EP    0188656    7/1986
FR    2952093    5/2011
(Continued)

OTHER PUBLICATIONS

International Search Report and Written Opinion, dated Sep. 18, 2013, 8 pages.

*Primary Examiner* — Basil Katcheves
(74) *Attorney, Agent, or Firm* — Dicke, Billig & Czaja, PLLC

(57) ABSTRACT

A device for fixing an item to a building structure, for example for use as a roof fixing, is disclosed. It consists of a base plate (30) having a projecting member projecting from one side of it, for example a threaded stud or bolt (40), and an impermeable cover member, for example in the form of a solid block (35) which can be threaded on to the projecting member. The cover member compresses a waterproof membrane located between it and the base plate (30) to form a waterproof seal. The waterproof membrane extends past the edges of the base plate (30) and its projecting edges are sealed to the structure.

7 Claims, 3 Drawing Sheets

(51) Int. Cl.
  *E04D 5/14*   (2006.01)
  *H02S 20/23*  (2014.01)
  *E04B 1/66*   (2006.01)
  *F24J 2/52*   (2006.01)

(52) U.S. Cl.
  CPC .............. *E04D 5/145* (2013.01); *F24J 2/525* (2013.01); *H02S 20/23* (2014.12); *Y02B 10/12* (2013.01); *Y02B 10/20* (2013.01); *Y02E 10/47* (2013.01)

(58) Field of Classification Search
  CPC   H02S 20/23; E04D 5/14; E04D 5/145; E04D 5/143; Y02E 10/47; Y02B 10/12; Y02B 10/20
  USPC .............................. 52/27, 405.3, 309.12, 395
  See application file for complete search history.

(56) References Cited

U.S. PATENT DOCUMENTS

| | | | |
|---|---|---|---|
| 5,181,360 A * | 1/1993 | Shingler | 52/520 |
| 6,945,005 B2 * | 9/2005 | Nunley | 52/650.3 |
| 2013/0001820 A1 * | 1/2013 | Kraus et al. | 264/46.4 |

FOREIGN PATENT DOCUMENTS

| | | |
|---|---|---|
| FR | 2964128 | 3/2012 |
| JP | 2005194771 | 7/2005 |
| WO | WO 2007093421 A2 * | 8/2007 |
| WO | WO2013175226 | 11/2013 |

* cited by examiner

DEVICES FOR FIXING ITEMS TO BUILDING STRUCTURES

This invention relates to devices for fixing items to building structures.

Such devices are often referred to as "roof fixings" as they are extensively used for mounting items such as aerials, satellite dishes, railings, edge protection devices, walkways, roof plant platforms, solar panels and other structures to flat or pitched roof structures, or on to vertical surfaces, such as walls.

In the construction of buildings, waterproofing membranes, (flexible sheet materials made of, for example, PVC, rubber, synthetic rubbers such as EPDM rubber, and bitumen-impregnated fabric) are used as a waterproofing layer on or over various parts of the structure in various applications, for example roof or wall surfaces subject to weathering, tanking in basements, and for lining other surfaces. The continuity of these membranes is essential to the integrity of their primary function of waterproofing the structure.

Where items require fixing to the structure of the building which lies behind or underneath these membranes, any fixing or anchor for the item that penetrates the membrane necessarily compromises the integrity of the membrane and therefore its effectiveness. Although it is known to use sealant to prevent water penetration where a fixing or anchor passes through the membrane, this is not always permanently effective; in particular, chemical reactions can occur between the membrane and the sealant, there can be differing life expectancies between the membrane and the sealant, and deterioration of the sealant occurs over time due to external conditions, i.e. exposure to sun and rain, and varying temperature, both seasonal and diurnal.

In respect of items fixed to the structure of a building, wind and weather conditions can produce lateral and vertical forces that act upon the item and the fixing with which it is secured to the structure. While snowfall can produce downward loading but wind can produce upward and sideways forces upon the items and their fixings.

Roof fixings are disclosed in the patent literature, for example in WO 2012/055928A and WO 2012/163570 among others. The roof mounting devices of these specifications are not explicitly reliant only on a simple mechanical method of sealing to the waterproof membrane and in some cases, only provide a single point of attachment to the structure.

According to the present invention, there is provided a device for fixing an item to a surface of a building structure incorporating a waterproof membrane, the device comprising a base plate, at least one fixing member projecting from one side of the base plate, a waterproof membrane extending across the base plate and having an aperture through which the fixing member protrudes, an impermeable cover member over the fixing member, covering the aperture in the waterproof membrane and including means to attach the item thereto, and characterised in that the cover member is engaged on the fixing member so that the waterproof membrane is compressed between base plate and a face of the cover member to form a waterproof seal with the waterproof membrane, and the base plate has two or more through-holes in it to enable the base plate to be fixed to the building structure beneath the waterproof membrane.

Preferably the base plate has a single, usually central, threaded stud or bolt and the cover member has a blind threaded hole extending from one side of the cover member and depth greater than the length of the stud or bolt. The membrane to be compressed between the base plate and cover member so that a watertight seal is achieved. Around the blind hole in the cover member are preferably one or more raised ribs or beads in order to improve the effectiveness of the seal between the surface of the waterproof membrane and the cover member.

The means for affixing the item to be attached to the building to the fixing device may be, for example, threaded holes tapped into or studs extending from the other side of the cover member; i.e. the side away from the base plate.

The waterproofing membrane extends past the edges of the base plate to provide a peripheral margin of overlapping waterproof membrane which can be sealed down on to the waterproof membrane on the existing building structure in accordance with the manufacturer's instructions. The lap joint about the periphery of the base plate prevents water penetrating to the fixings holding the base plate on to the building structure.

The fixing devices of the invention can be used with any waterproofing membrane material used as an external or internal waterproofing layer to roofs and walls to provide an anchor or fixing point whilst maintaining the effectiveness of the particular membrane in use. It allows objects to be fixed relative to the underlying structure, via the device, without compromising the integrity of the waterproofing layer that lies over that structure.

The base plate preferably has perimeter holes in it for fixing the plate to the building structure, using fixings selected to withstand the loads expected to be encountered once the once the item to be fixed to the building has been installed on the fixing device. The cover member has a dual function. It is used as a pressure plate making a seal to the waterproof membrane and it also provides a fixing or anchor point to which the items to be fixed are secured. When the fixing means enabling the base plate and the cover member to be held together with compression of the waterproof membrane between them are a threaded projecting stud or bolt and a threaded hole in the cover, the two parts are effectively bolted together. Because there are no openings or holes in the cover member that completely penetrate it, the device provides a completely waterproof fixing point.

Preferably a spacer member is located around the threaded stud or bolt so that when the cover member is tightened against the baseplate the optimum compression of the waterproof membrane for a waterproof seal is achieved and maintained. The thickness of the spacer member should be chosen relative to the thickness of the waterproof membrane.

In contrast to a variety of roof fixings on the market, the roof fixing device of the invention can be used with any waterproofing material supplied in the form of a sheet or a membrane giving complete compatibility with the sheet or membrane being used and its use avoids the industry accepted minimum upstand height of approximately 150 mm for a flashing upstand against any penetration through a roofing membrane. Further to this, no compounds, sealants, glues, heat, welding or other chemical processes are necessary as the design relies on a mechanical seal only. Devices in accordance with the present invention may be designed to have a very low profile, enabling e.g. solar panels to be installed without projecting very far from the original roof surface thus avoiding certain local authority planning permission requirements for objects attached to the building structure.

The advantage of the multiple points by which the device may be fixed to the structure in the present invention is that where, as is normal, a continuous part of the structure exists beneath the waterproof membrane, the device can be fixed in any location and orientation. This is because the multiple fixing points can combine to give the fixing device a greater resistance to wind forces than a single fixing point which must usually be located over and fixed into a load bearing part of the structure such as a supporting beam or rafter.

The device provides an intermediate fixing or anchor point that is integral to the waterproof membrane and is positionally between the supporting structure and the object being supported obviating a direct fixing that penetrates the waterproofing layer. The cover member is preferably of solid metal construction, one face of which is flat and the other face of which is flat but has one or more raised concentric ribs centred on the threaded hole, so that when the cover member is fixed to the base plate, the ribs press into the surface of the waterproof membrane so as to provide a completely waterproof seal.

The device according to the invention can be used anywhere a fixing point is required where a sealing or waterproof membrane that must be kept continuous to fulfil its primary purpose also needs to be installed.

The invention is illustrated by way of example in the accompanying drawings in which.

Figure 1:
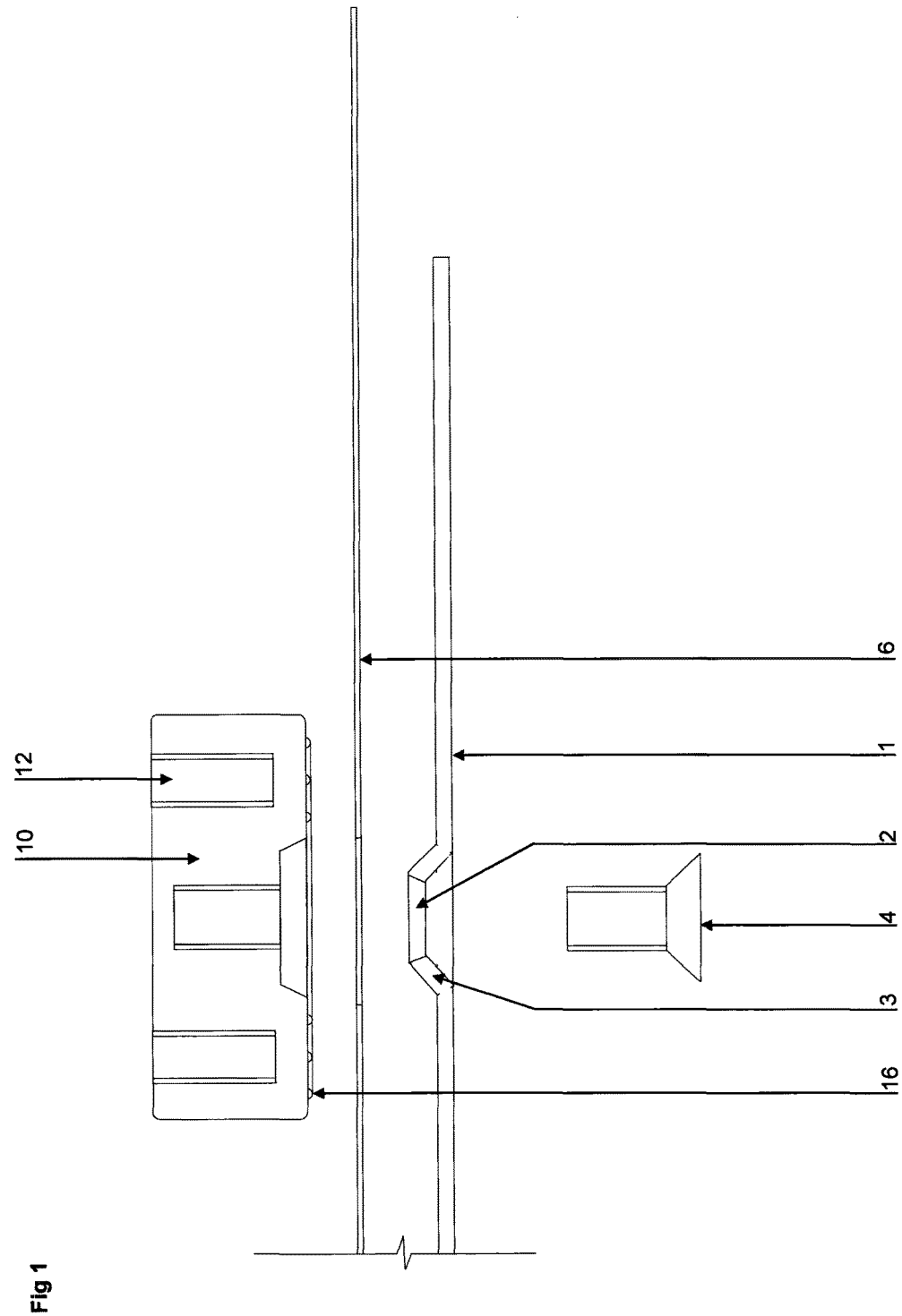
FIG. 1 is an exploded sectional view of a device in accordance with the invention.

Referring to FIG. 1, the device in accordance with the invention shown there consists of a steel plate 1, for example 300 mm square and 3 mm thick having a central hole 2 surrounded by an angled flange 3 pressed out of the plane of the plate. The threaded shank of a clamping bolt 4 passes through aperture 2.

Shown above plate 1 in FIG. 1 is a sheet 6 of waterproofing membrane of extent greater than fixing plate 1 and with a central circular aperture 8 which fits over the angled flange 3.

The final piece of the device is a cover member 10 which is formed of a metal block, for example stainless steel, and which has a pair of blind threaded fixing holes 12 extending from its upper surface and a blind threaded hole 14 extending from its lower surface and with a widened portion adjacent the lower surface to accommodate the angled flange 3. The lower surface also has three circular ribs 16. These ribs form a watertight seal with the top of the waterproofing membrane 6 when the threaded clamping bolt 4 is tightened. The membrane 6 is sandwiched between the ribs 16 and fixing plate 1 and, because of the pressure exerted at the points where the ribs occur, a very effective seal is formed which is entirely waterproof.

Figure 2:
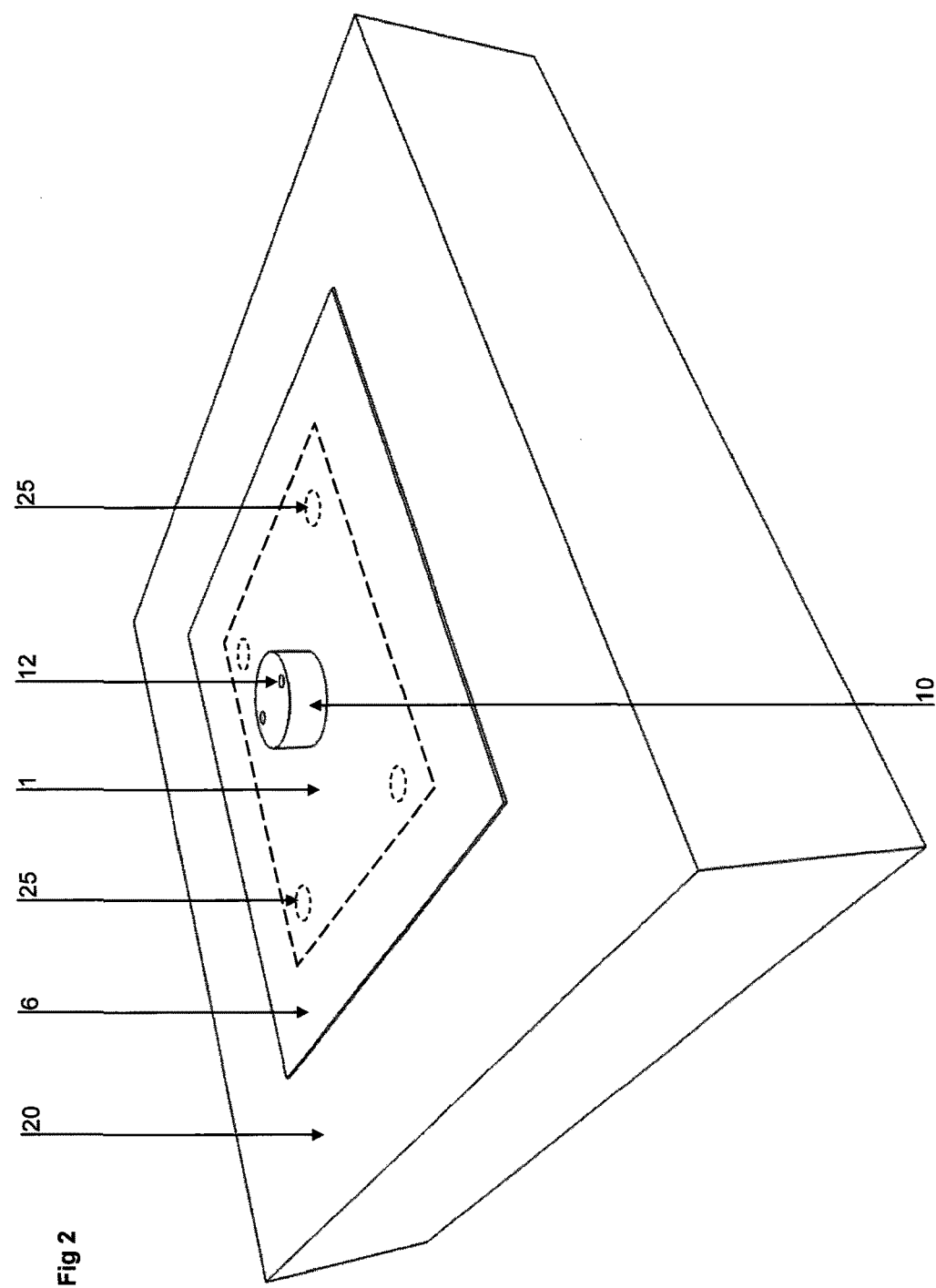
FIG. 2 is a diagrammatic perspective view of the device shown in FIG. 1 when installed.

FIG. 2 shows the device of FIG. 1 installed on a flat roof structure, the horizontal surface of which is covered with a waterproof membrane denoted 20. Indicated in dotted lines are four circular fixing holes 25 in the base plate which are used to fix the device to the building structure through the waterproof membrane 20 on the structure. These fixings lie under the waterproof membrane attached to the device which is sealed at its edges to the waterproof membrane 20 of the structure.

As can be seen from FIG. 2, the top of the cover member 10 has two threaded holes 12 in it into which fixing bolts may be threaded for attaching whatever item it is desired to mount on the building structure.

Figure 3:
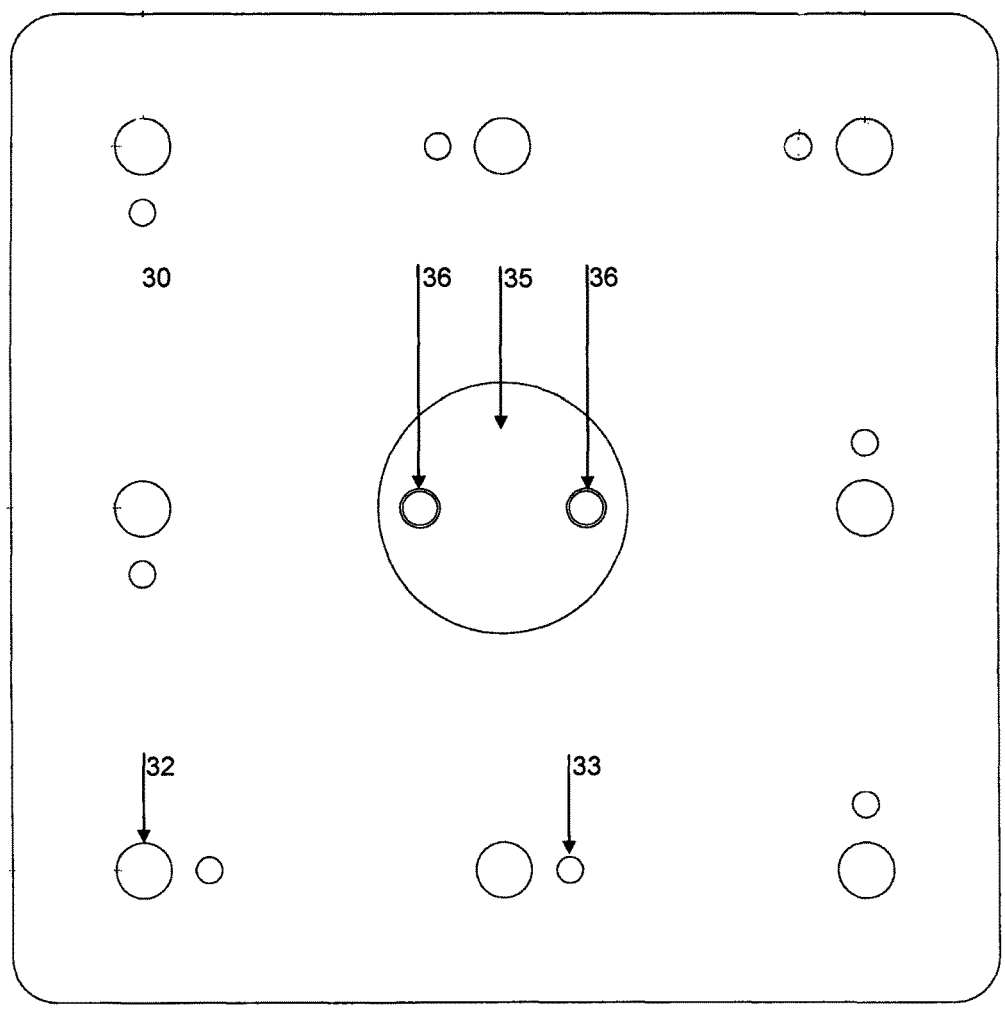
FIGS. 3, 4 and 5 are respectively plan, side and sectional views of an alternative embodiment.
Figure 4:
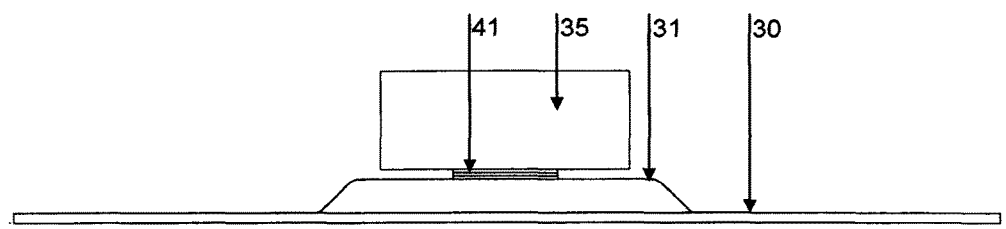
Figure 5:
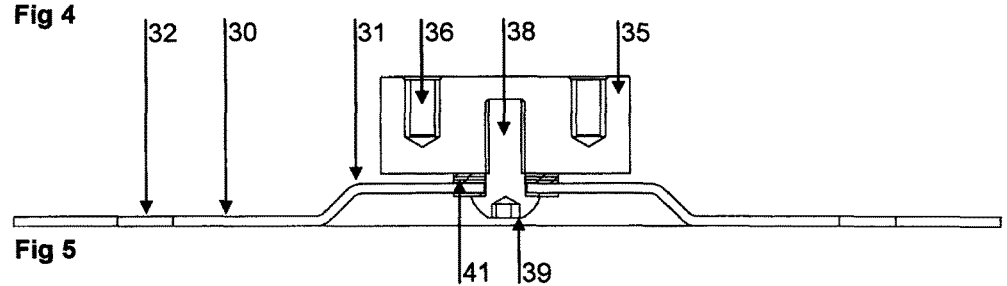

Referring now to FIGS. 3 to 5, this shows an alternative embodiment where the base plate has a raised central section which prevents the head of a securing bolt from protruding below the base of the fixing plate.

In detail, the base plate is denoted 30 and has a pressed central section 31 with a central hole in it. Around the edges of plate 30 are two alternative sets of fixing holes, one set being of large diameter fixing holes 32 suitable for use when the plate is attached via so-called thermally broken fixings, which tend to be of larger diameter, while the smaller holes denoted 33 may be used, for example, if the plate is simply to be fixed down using standard fixings appropriate to the situation. The cover member is denoted 35 and has two threaded blind holes 36 extending from its upper face. In its lower face, it has a blind threaded hole enabling it to be secured against the base plate using a securing bolt 38 which has a head 39 below the base plate and a threaded shank by which the cover member 35 may be secured. As shown in FIGS. 4 and 5, a spacer of variable dimension 41 is located between the cover member 35 and the upper surface of the raised section 31 of the base plate. This serves to ensure that the cover member 35 is fixed at the optimum distance from the base plate to effect a seal with the waterproof membrane and further, that operational loads applied to the cover member will not result in over or under compression of the waterproof membrane located between the sealing member and the upper surface of the raised section 31 of plate 30.

By varying the thickness of the spacer 41, the exact dimension between the base plate and cover member may be matched to the nature of the sealing membrane which covers the base plate 30 save for the aperture where the spacer rings 41 are located.

The invention claimed is:

1. A device for fixing an item to a surface of a building structure incorporating a waterproof membrane, the device comprising a base plate having a plurality of through-holes in it to enable the base plate to be fixed to the building structure beneath the waterproof membrane, at least one fixing member projecting from one side of the base plate, the waterproof membrane extending across the base plate and having an aperture through which the fixing member protrudes, an impermeable cover member over the fixing member, covering the aperture in the waterproof membrane and including means to attach the item thereto, in which the cover member is engaged on the fixing member so that the waterproofing membrane is compressed between the base plate and an underside of the cover member facing toward the base plate to form a waterproof seal with the waterproof membrane, and further comprising a spacer, separate from the base plate and the cover member, having upper and lower surfaces, a thickness, and a diameter less than a diameter of the aperture so that the lower surface of the spacer contacts the upper surface of the base plate while the upper surface of the spacer contacts the underside of the cover member; the spacer being located around the fixing member between the surface of the cover member facing closest to the base plate and the upper surface of the base plate; in which the thickness of the spacer fixes a distance between the underside of the cover member and the upper surface of the base plate to preclude overcompression of the membrane.

2. A device according to claim 1 wherein the fixing member projecting from the base plate is threaded and the cover member has a blind threaded hole, extending from one side, of depth greater than the length of the fixing member.

3. A device according to claim 1, in which the means to attach the item to the cover member includes at least one of a threaded hole tapped into and a stud extending from a face of the cover member opposite the face adjacent the waterproof membrane.

4. A device according to claim 1, in which the base plate has multiple perimeter holes in it for fixing the base plate to the structure.

5. A device according to claim 1, in which the fixing member is located on a raised area in a central region of the plate.

6. The device of claim 1, in which the surface of the cover member facing closest to the base plate has integrated into that surface at least one feature protruding from the surface by a distance sufficient to contact the membrane around the aperture.

7. The device of claim 6, in which the feature of the cover member is one of a rib and a bead.

\* \* \* \* \*